B. M. DES JARDINS.
TABULATING AND COMPUTING ATTACHMENT FOR TYPE WRITER MACHINES.
APPLICATION FILED JULY 10, 1899. RENEWED SEPT. 26, 1912.
1,165,325.
Patented Dec. 21, 1915.
9 SHEETS—SHEET 2.
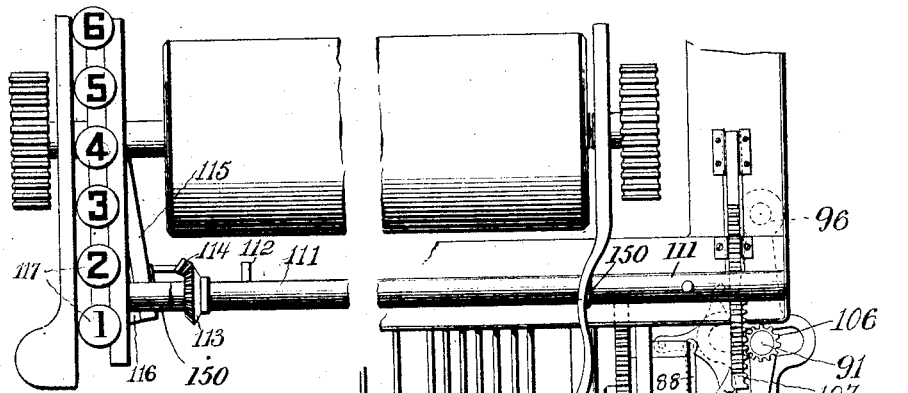
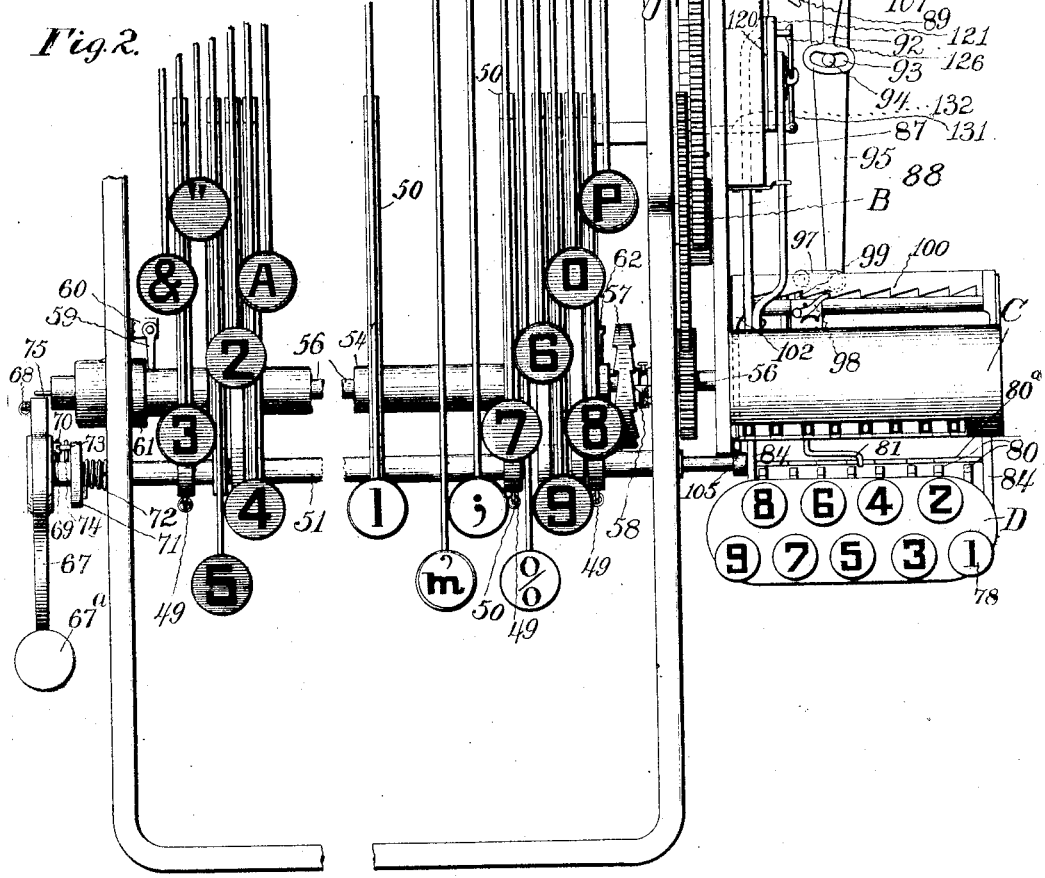
Fig. 2.

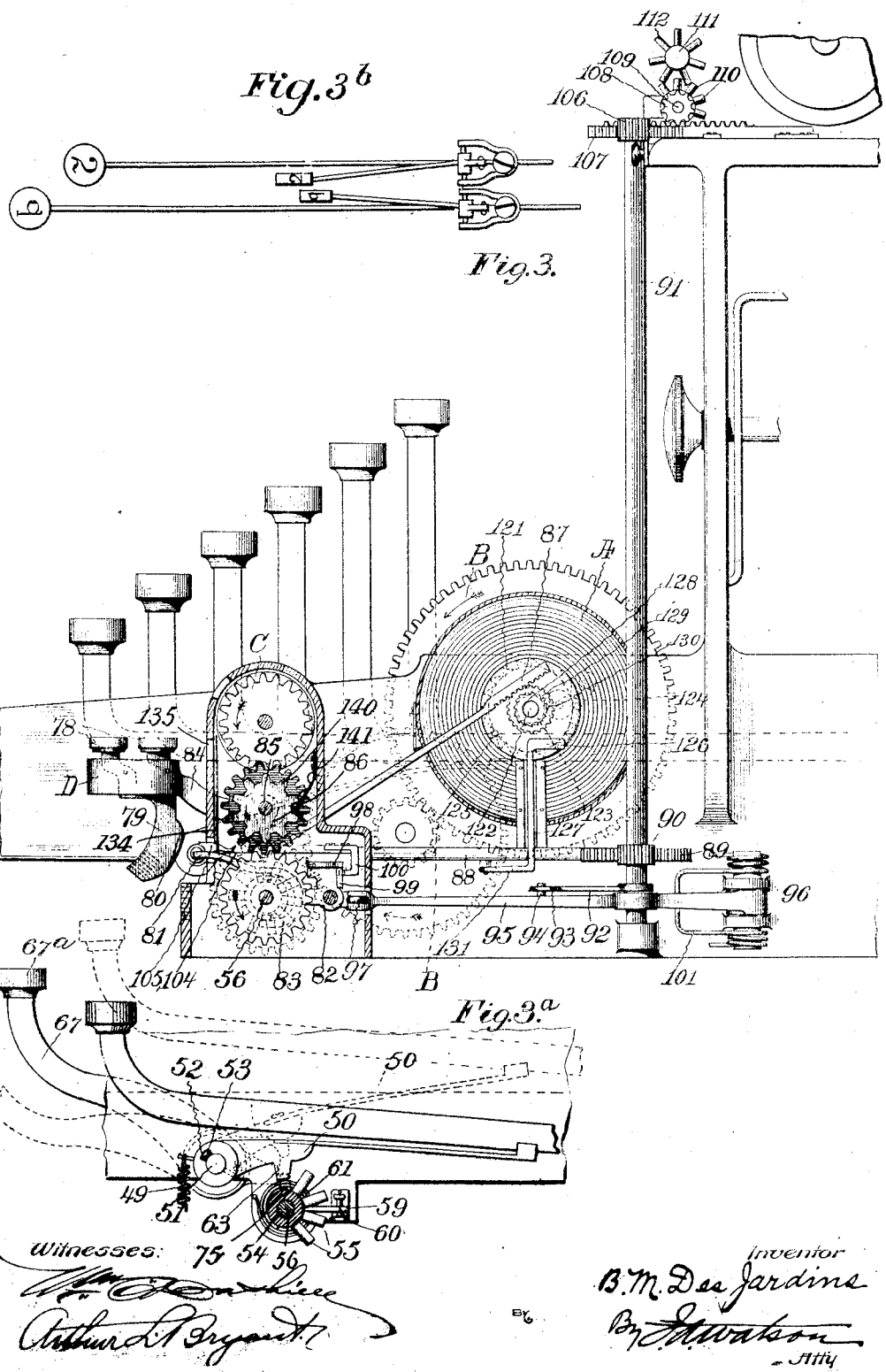

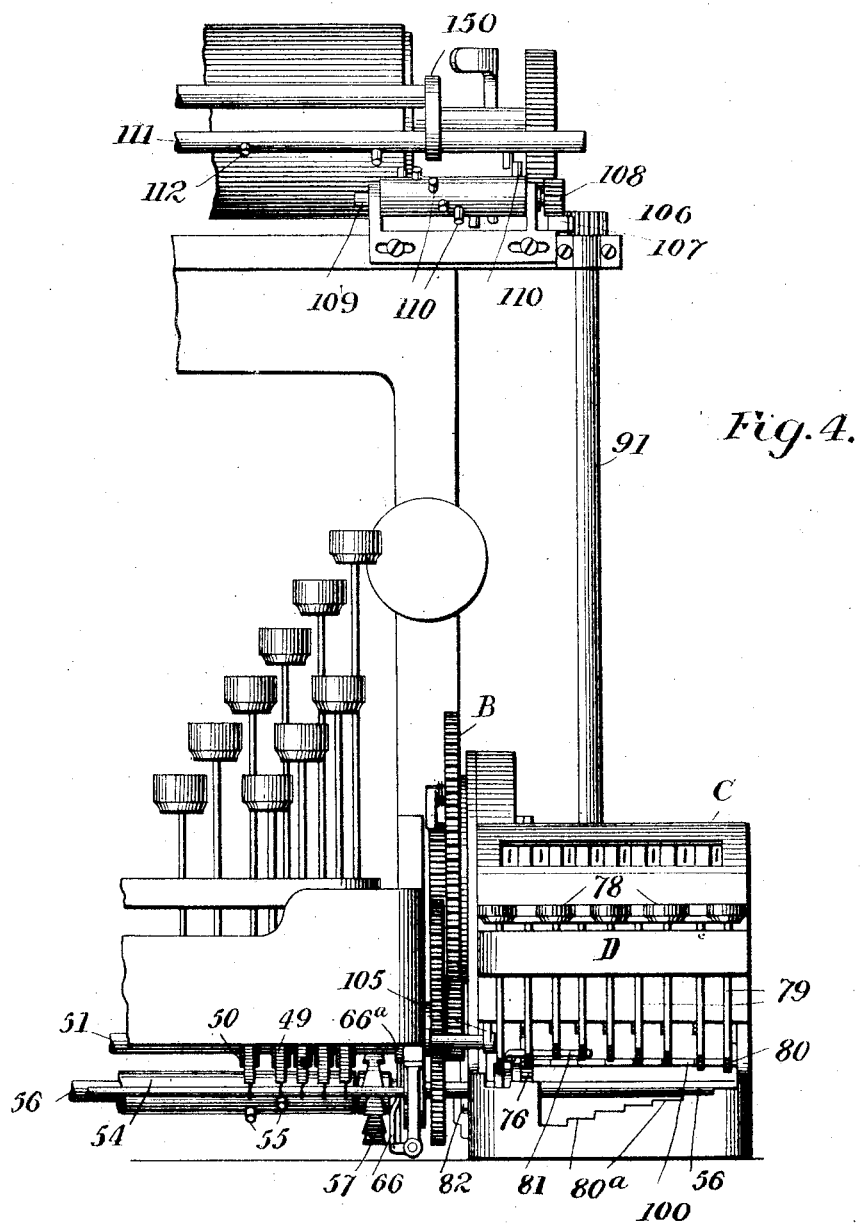

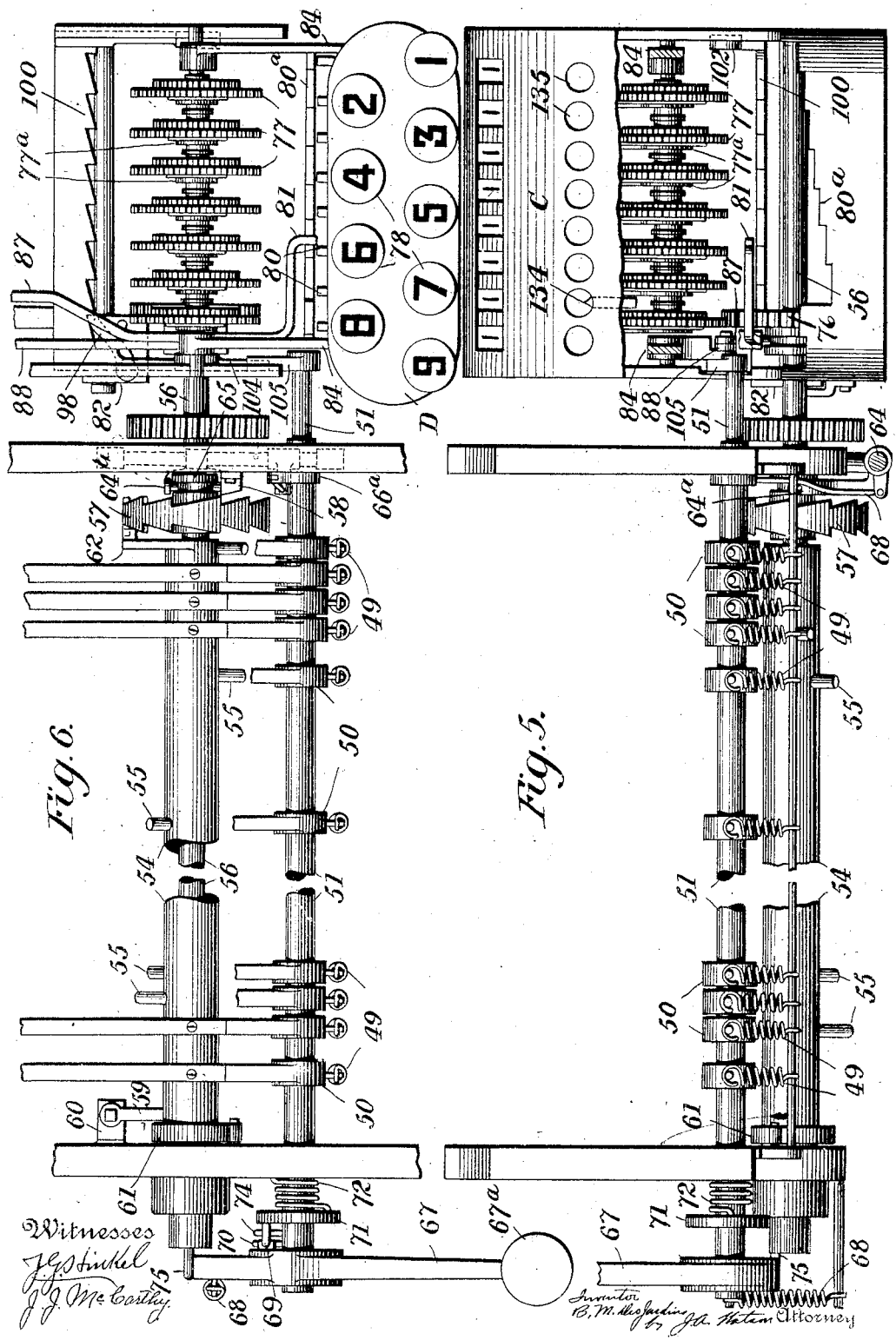

B. M. DES JARDINS.
TABULATING AND COMPUTING ATTACHMENT FOR TYPE WRITER MACHINES.
APPLICATION FILED JULY 10, 1899. RENEWED SEPT. 26, 1912.

1,165,325.

Patented Dec. 21, 1915.
9 SHEETS—SHEET 6.

Witnesses

Inventor
B. M. Desjardins
by
Attorney

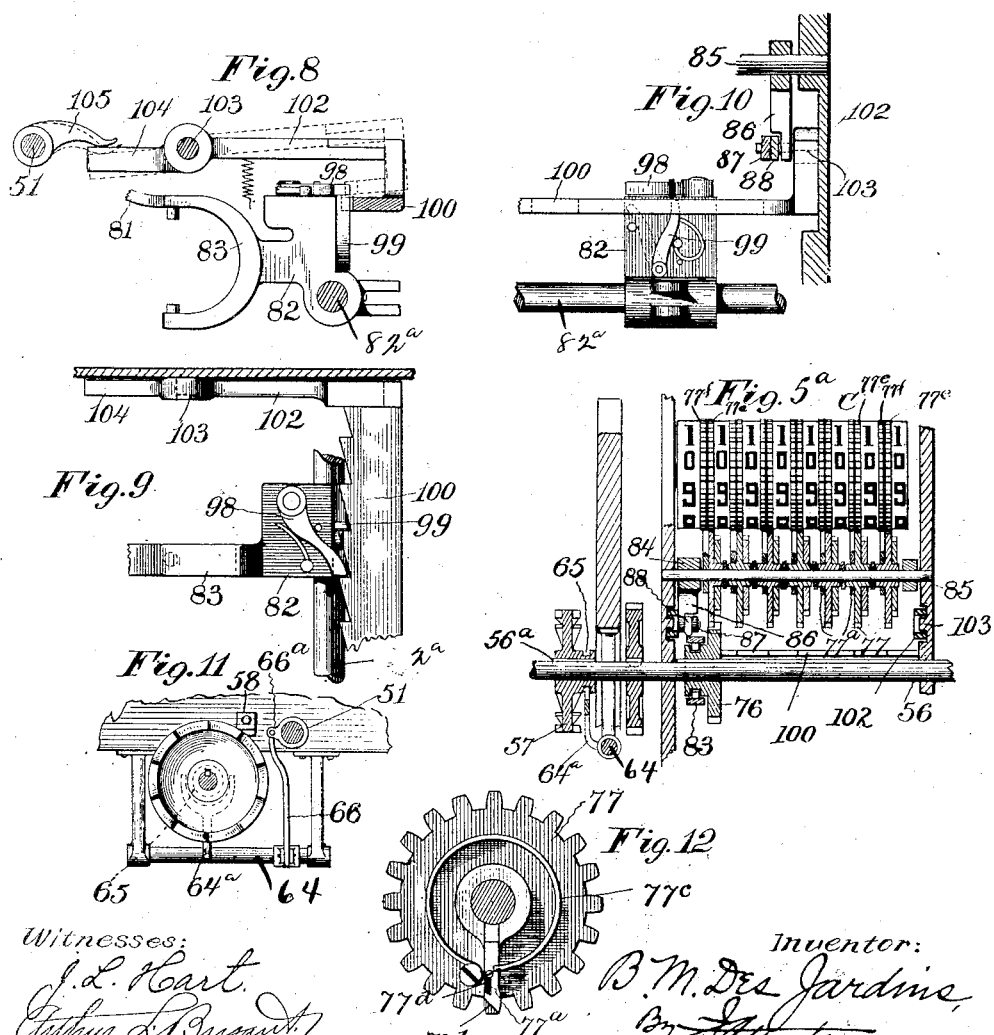

B. M. DES JARDINS.
TABULATING AND COMPUTING ATTACHMENT FOR TYPE WRITER MACHINES.
APPLICATION FILED JULY 10, 1899. RENEWED SEPT. 26, 1912.
1,165,325.
Patented Dec. 21, 1915.
9 SHEETS—SHEET 8.
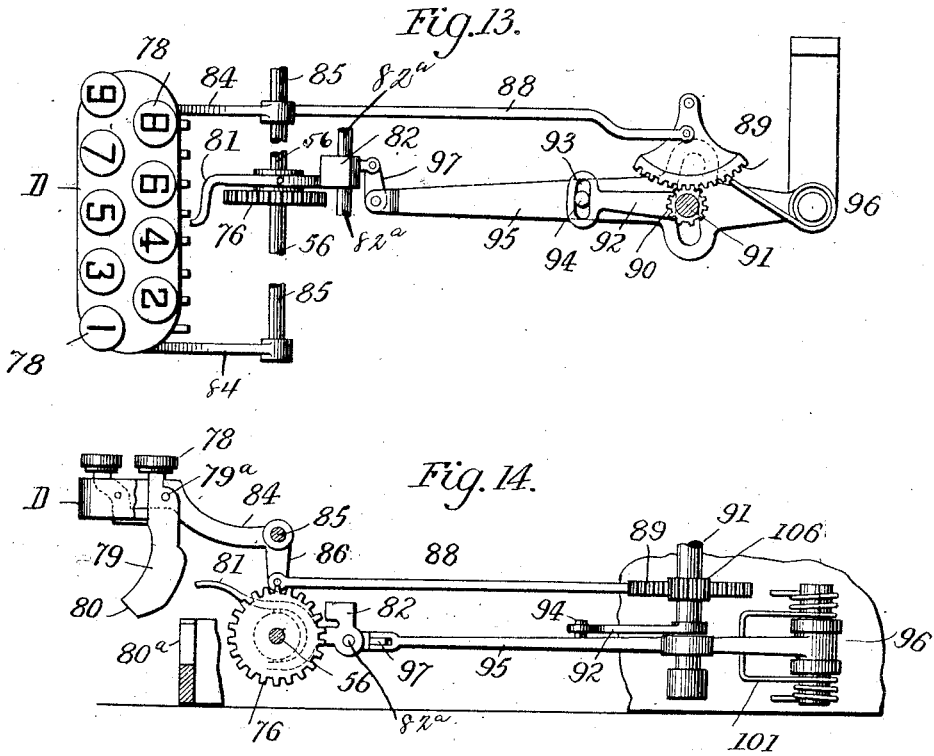

B. M. DES JARDINS.
TABULATING AND COMPUTING ATTACHMENT FOR TYPE WRITER MACHINES.
APPLICATION FILED JULY 10, 1899. RENEWED SEPT. 26, 1912.
1,165,325.
Patented Dec. 21, 1915.
9 SHEETS—SHEET 9.
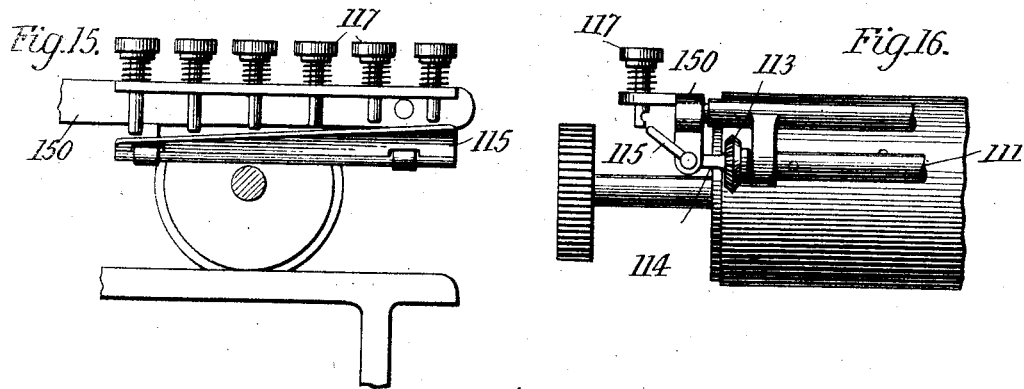
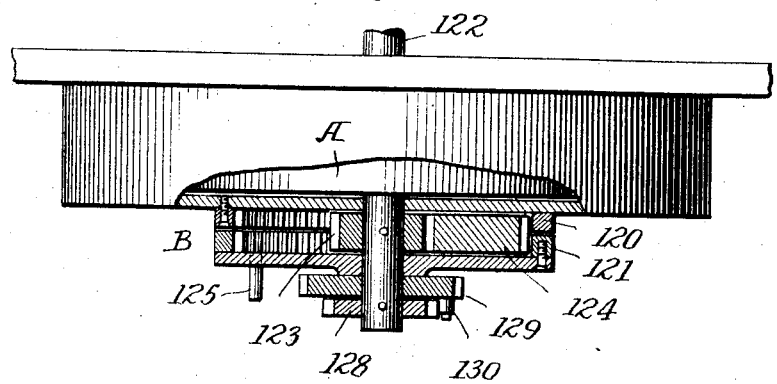
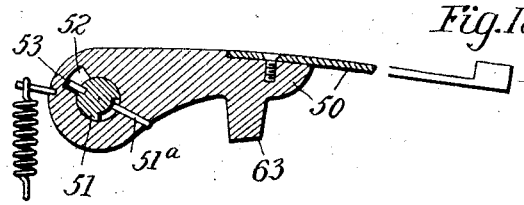

UNITED STATES PATENT OFFICE.

BENJAMIN M. DES JARDINS, OF WEST HARTFORD, CONNECTICUT, ASSIGNOR, BY MESNE ASSIGNMENTS, TO JOHN T. UNDERWOOD, OF BROOKLYN, NEW YORK.

TABULATING AND COMPUTING ATTACHMENT FOR TYPE-WRITER MACHINES.

1,165,325.　　　　Specification of Letters Patent.　　Patented Dec. 21, 1915.

Application filed July 10, 1899, Serial No. 723,390.　Renewed September 26, 1912.　Serial No. 722,529.

*To all whom it may concern:*

Be it known that I, BENJAMIN M. DES JARDINS, citizen of the United States, residing at West Hartford, in the county of Hartford and State of Connecticut, have invented certain new and useful Improvements in Tabulating and Computing Attachments for Type-Writer Machines, of which the following is a specification.

This invention comprises various improvements in tabulating and computing devices for typewriting machines.

The tabulating device includes means for quickly setting a typewriter carriage to any point on the scale for the purpose of locating the first figure or letter of a line forming part of a column. The tabulating mechanism also comprises means for setting adding devices at the proper denomination, and means are provided for turning the numbered disks in accordance with the values represented by the operated figure keys of the typewriter. Said tabulating mechanism therefore is connected to and coöperates with devices whereby a column of figures may be simultaneously written upon the typewriter and added upon the computing register.

The invention further consists in various improvements in the details of the computing mechanism, some of which are applicable to similar mechanisms previously invented by me, and described in Patent No. 763,966 issued July 5, 1904, and application No. 702,163 filed January 14, 1899.

Figure 1:
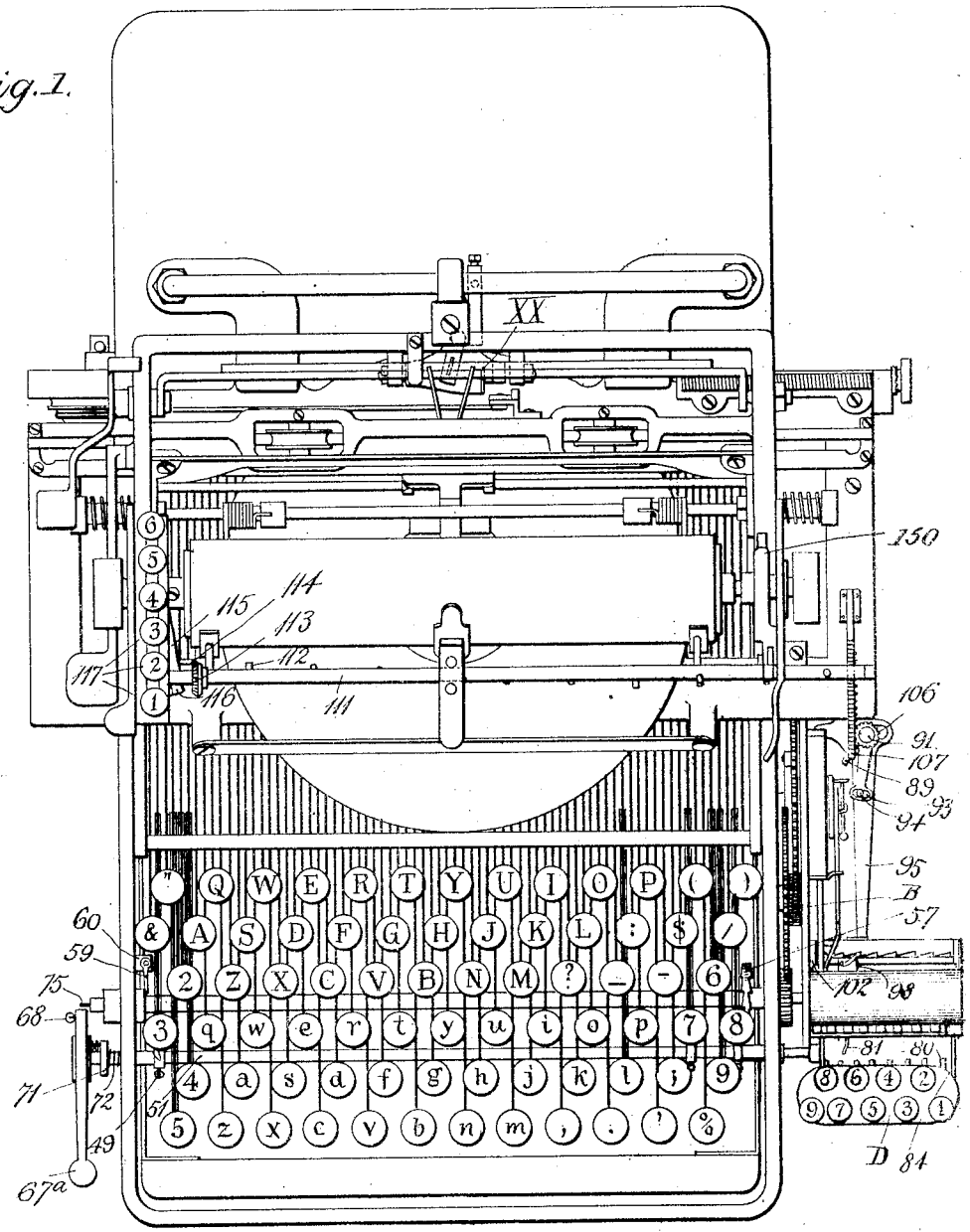
Figure 7:
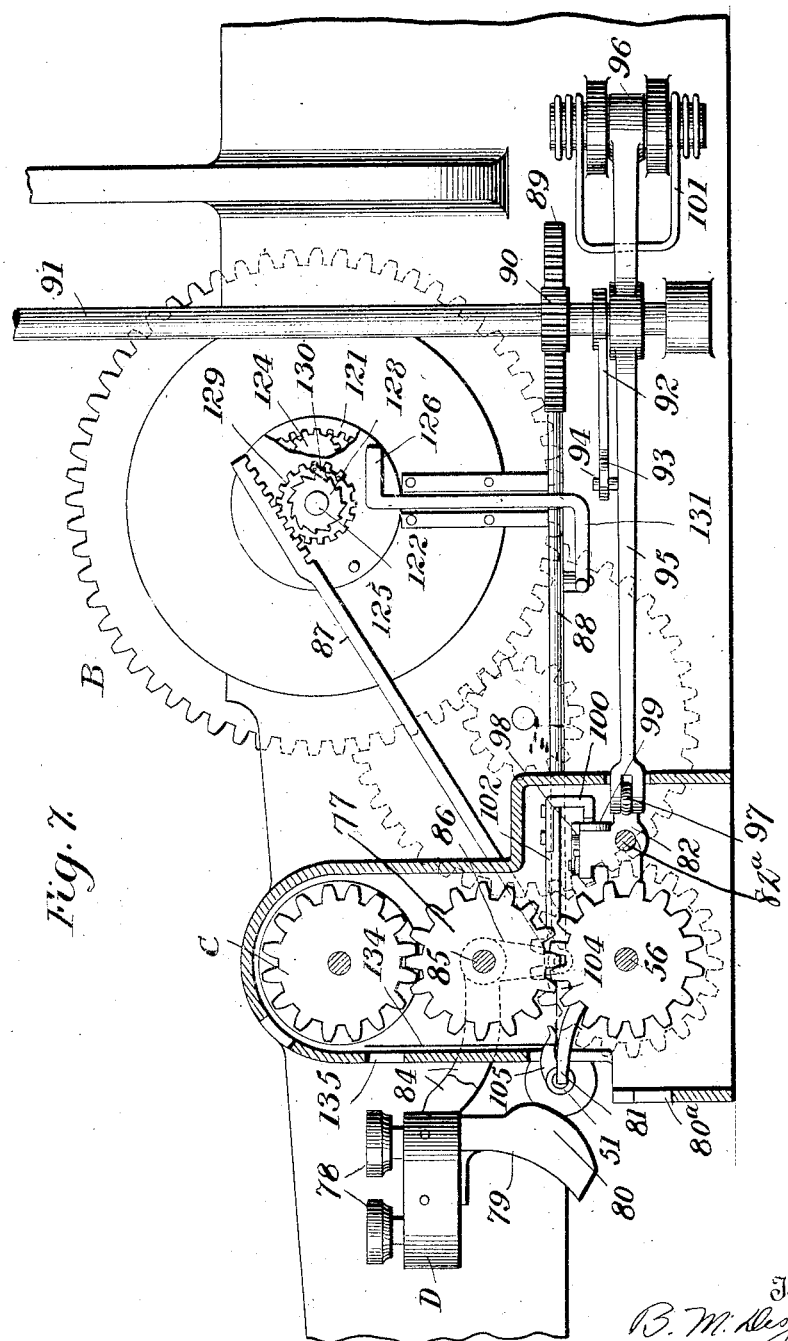

The invention is illustrated in the accompanying drawings, in which,

Figure 1 is a plan view showing the attachment connected to a Hartford typewriter; Fig. 2 is a partial plan view on an enlarged scale; Fig. 3 is a right side elevation of the same, shown partly in section; Fig. 3ª is a right side elevation of the shifting mechanism for throwing the attachment in and out of connection with the typewriter; Fig. 3ᵇ illustrates a figure and letter type and the connection thereof with the operating keys of the typewriter; Fig. 4 is a front elevation illustrating particularly the computer and carriage stop; Fig. 5 is a front view of the computing attachment with its operating mechanism, the power transmitting lever being broken away; Fig. 5ª is a sectional front view of the computing register; Fig. 6 is a plan view of the parts shown in Fig. 5, the numbered disks of the computing register being removed; Fig. 7 is a partial side view showing the power transmitting lever of the tabulator and accompanying parts, the computing devices being shown in section and with some of the parts detached; Figs. 8, 9 and 10 show the escapement for locating the driver for the computing register; Fig. 11 is a detail of the escapement of the computing register; Fig. 12 is a side elevation of one of the carrying wheels of the computing register; Fig. 13 is a plan view of the devices for setting the driver of the computing register; Fig. 14 is a side view of the parts shown in Fig. 13, partly broken away; Fig. 15 is a left end view of the typewriter carriage shown in Fig. 1 and the devices supported thereon; Fig. 16 is a front view of the parts shown in Fig. 15; Fig. 17 shows in transverse section the differential gearing of the rewinding mechanism; and Fig. 18 is a detail sectional view of the connections between the levers 50 and the shaft on which they are mounted.

The invention includes an adding machine or register C which in the embodiment of the invention illustrated in the accompanying drawings, is arranged at one side of the key-board of the typewriter, and a series of operating levers 50 adapted by means to be hereinafter described to actuate said adding machine or register.

The invention is not limited to use with any particular form or style of typewriter, but is capable of application to various styles of such machines, all, however, including a series of letter and figure type keys for actuating said type, a platen, and means controlled by each of the keys for effecting a relative step by step movement between the platen and type. In the particular machine illustrated the escapement or key actuated device for controlling the step by step longitudinal movements of the platen is indicated at X X, said escapement coöperating with a suitable rack bar attached to the carriage in which the platen is mounted.

The operating levers 50 for the register (as shown most clearly in Figs. 2, 3ª and 18) are pivotally mounted on a shaft 51 extending transversely of the key-board of the typewriter, each lever being vertically movable under the lever of a figure key of the typewriter, there being a lever 50 for each figure key lever. When a figure key lever is depressed, the corresponding operating lever 50 rocks the shaft 51 sufficiently to operate the escapement controlling the power devices by which the adding mechanism or register is operated. As shown in Figs. 3ª and 18, the levers 50 are loosely mounted upon the shaft 51, the hub of each lever being provided with an opening 52 into which extends a pin 53 projecting from the shaft, and the levers are held from lateral movement on the shaft by pins 51ª, which enter lateral grooves in the shaft, as shown in Fig. 18. The pins are so located with respect to the openings 52 that the first part of the downward movement of a lever 50 does not disturb or affect the shaft. During the last part of said movement of the lever however, the lower wall of the opening 52 in the lever engages the pin 53 and rocks the shaft sufficiently to release the escapement as will be hereinafter explained. The levers 50, as shown, are formed of two parts connected by screws.

Upon a shaft 54, hereinafter referred to as the "escape shaft", which is adjacent to and extends parallel with the shaft 51, are a series of radial stop pins 55, one for each figure key of the typewriter. As shown, the shaft 54 is tubular and surrounds a portion of a power shaft 56, said shaft 56 being connected by a train of gearing B with a suitable motor A, whereby it constantly tends to rotate in one direction. The escape shaft is adapted to be connected with said power shaft 56 through the medium of an escape wheel 57, which is connected with the shaft 56 by a suitable key or feather 56ª, so as to rotate with and slide upon said shaft. The escape wheel is provided on each side of its periphery with ten uniformly spaced teeth and an arm 62 on the escape shaft is adapted to be engaged by adjacent teeth on said wheel when the latter is moved toward the left, as will be hereinafter described. Normally when the attachment is connected with the typewriter to be operated by the figure keys, the escape wheel occupies the position shown in Figs. 2 and 5ª of the drawings at the right hand end of its path of sliding movement, in which position it is engaged by a fixed stop 58 (Figs. 2 and 6), which holds said wheel and the shaft 56 and motor A stationary. A pin 59 (Figs. 2, 3ª and 6) projecting from the escape shaft 54 is normally held against a fixed stop 60 by means of a suitable spring 61, surrounding said shaft. The spring 61 while strong enough to turn the escape shaft 54 to bring the pin 59 against the stop 60 when the motor is held stationary by the stop 58, as above described, is sufficiently sensitive to be readily overcome by the power of the motor and to offer but little resistance to the rotation of the escape shaft by the motor in the opposite direction from which it tends to turn said shaft. When the parts are in the normal inactive position, but in position to be operated by the figure keys of the typewriter, the arms 62 on the escape shaft is opposite and in position to be engaged by a tooth of the escape wheel 57 if the latter is moved to the left.

The stop pins 55 on the escape shaft are uniformly spaced on said shaft and when the shaft is connected with the motor by the adjustment of the escape wheel 57, it will rock until one of said pins engages one of a series of depending stop projections 63 on the operating levers 50. Each lever 50 is provided with one of said projections 63 and the stop pins 55 are arranged in alinement with said projections 63, but the distance between each of said pins 55 and its coöperating stop 63 is different from that between every other pin of the series and its stop. When the parts are in normal position the stops 63 on the levers 50 are all at the same distance from a common line on the escape shaft and the stop pins 55 are respectively arranged in rear of said line at distances increasing by one-tenth of the circumference of the escape shaft from right to left so that when the stop projection actuated by the lever of the figure one key of the typewriter is depressed, the escape shaft will move one-tenth of a revolution before the co-acting pin 55 thereon will engage the projection 63 on the lever 50 actuated by said figure one key, and when the figure two key is actuated, the projection 63 on the lever 50 thereby operated will not be engaged by its co-acting stop 55 until the escape shaft has moved through two-tenths of a revolution, etc.

The escape wheel is shifted from engagement with the fixed stop 58 into engagement with the arm 62 of the escape shaft whenever a figure key of the typewriter is depressed. This movement is produced by a rock shaft 64 (see Figs. 5, 5ª and 11) which has one arm provided with a fork 64ª engaging a groove 65 in the hub of the escape wheel and a second arm connected by a link 66 with an arm 66ª on the shaft 51. The shaft 51 is, as hereinbefore described, rocked whenever a lever 50 is rocked by its co-acting figure key lever and whenever said shaft 51 is rocked in this manner the movement transmitted through the link 66 and rock shaft 64 shifts the escape wheel 57 out of engagement with the stop 58 and into engagement with the arm 62 on the escape shaft. It will thus be seen that whenever either of the levers 50 is rocked by a figure key lever, the escape shaft 54 and power shaft 56 will be rocked through a portion of a revolution corresponding to the value of the figure key by which the active lever 50 is operated and such movement of the shaft 56 is transmitted to the adding mechanism by a driving gear or "driver" 76 mounted on the shaft 56 and adapted to be engaged with either of the trains of gears in the register C, as will be hereinafter described.

In the embodiment of the invention illustrated in the accompanying drawings, the attachment is normally out of operative relation with the typewriter but may be instantly connected therewith by operating a shift lever 67 mounted on the shaft 51. To the rear end of this shift lever is connected a spring 68 which normally holds said rear end down, in which position a lug 69 on the lever engages a pin 70 on shaft 51 and holds said shaft in such position that the levers 50 thereon are below the paths of the figure key levers of the typewriter, the spring 68 being strong enough to overcome the springs 49 which act to raise the operating levers 50 and hold them beneath the figure key levers to be operated thereby, (see Figs. 2, 3ª and 6).

Upon the shaft 51 is a loose disk or collar 71 which is connected with the shaft by a spiral spring 72. The disk has an arm 73 which engages a pin 74 on said shaft. When the spring 68 is holding the shaft 51 in position to prevent the levers 50 from being rocked when the figure keys of the typewriter are actuated, the arm 73 of the disk or collar 71 is in contact with the pin 74 on the shaft 51. When the key 67ª at the forward end of the lever 67 is depressed, to throw the attachment into operation, the arm 69 on said lever engages the arm 73 on the disk 71, thus putting the spring 72 under tension with a tendency to rock the shaft 51 and aid the springs 49 in throwing up the operating levers 50 into engagement with the levers of the figure keys.

When the attachment is disconnected from the figure key levers, the escape wheel 57, as shown in Figs. 5 and 6, is in engagement with the arm 62 on the escape shaft, as the rocking of the shaft 51 to move the levers 50 from the position where they will be actuated by the figure key levers, acts to slide said escape wheel to the left on its supporting shaft; but the shaft 56 is prevented from rotating at such times by a pin 75 projecting from a collar on the left hand end of the escapement shaft 54 and bearing against the rear end of the lever 67. This stop pin 75 is situated above the axis of the shaft 54, (Fig. 5), and said pin is in the nature of a crank pin which prevents the shaft from revolving by abutting against the end of lever 67. The shaft 56 is therefore also locked against rotation when the attachment is disconnected from the figure key levers, although the escape wheel 57 is not engaged by the stationary stop 58. The shaft 56 extends beneath the wheels of the register C and on said shaft, as before described, is mounted the "driver" 76 which is adapted to be shifted along the shaft to engage any one of the carrying wheels 77 in the adding machine or register.

In using the invention as an attachment for the typewriter, for the purpose of simultaneously adding numbers and writing them, it is necessary to adjust the driver 76 to correspond with the position of the typewriter carriage before commencing to write each number and it is essential that the driver should have a step by step movement corresponding to the step by step movement of the typewriter carriage, while the number is being written.

For the purpose of adjusting the driver to bring it into engagement with the proper carrying wheel for the first figure of any number, I use a key board D having a series of suitably marked keys 78. Each of these keys is mounted on the upper end of a lever 79 fulcrumed at 79ª and having a toe 80 at its lower end. When pressure is applied to either key 78, the lever 79 thereof is first rocked about its pivot 79ª and the toe is moved rearwardly into position to engage a stop 80ª on the frame of the register C and then the key board D is rocked down, as will be hereinafter described. The toes 80 of the several levers 79 are of different lengths to correspond, inversely, with the respective distances through which the driver 76 is to be moved. The key board D is mounted on arms 84 pivotally supported on the shaft 85 on which the carrying wheels 77 of the register are mounted. An arm 86 rigidly connected with one of said arms 84 is connected with a rack 87 which meshes with a pinion 129 geared to the motor A and adapted through intervening mechanisms to rotate the carrying wheels and numbered disks of the register in accordance with the various figures written by the typewriter when the levers 50 of the attachment are in position to be actuated by the operation of the figure key levers. This is accomplished by means of a spring which reserves the power exerted in depressing the armor lever 84, which spring is herein referred to as the "motor A". Said spring will be partially wound every time the key board D is depressed, as will be more fully explained hereinafter. When either of the keys 78 is depressed, its toe 80 is moved into the path of the stop 80ª, as above described, and also into position to intercept an arm 81 on a slide 82 which is mounted on a rod 82ª and connected with the driver 76 by a yoke 83 engaging a groove in the driver hub.

A link 88 connects the arm 86 with a sector gear 89, which gear meshes with a pinion 90 on a rock shaft 91 (Figs. 7, 13 and 14). The shaft 91 also carries an arm 92 having a segmental slot 93 through which extends a pin 94, said pin being fixed on a lever 95 which is pivoted to the main frame at 96 and has formed therein a curved slot through which the rock shaft 91 extends. From these connections it will be seen that whenever the key board D is depressed it operates to rock the shaft 91 and when the end of the slot 93 in said arm comes into contact with the pin 94, the lever 95 is moved in the same direction as said arm 92. The forward end of the lever 95 is connected by a link 97 with the slide 82 which carries the driver 76. Said slide also carries two pawls 98 and 99, (Figs. 8, 9 and 10), which coöperates with a vibrating rack 100 forming an escapement of a type that is common and used on some typewriters. A spring 101 coiled about the pivot 96 of the lever 95 and bearing on said lever tends to move the slide 82 and driver 76 to the right and as the rack 100 is vibrated to engage alternately the pawls 98 and 99, said slide and driver will receive a step by step movement under the influence of said spring 101. The rack 100 is supported by a frame 102 pivoted at 103 and having a forward extension 104 which is adapted to be engaged by an arm 105 on the shaft 51, when said shaft is rocked by either of the leaves 50 or by the action of the spring 68, as hereinbefore described. That is, when the attachment is disconnected from the typewriter the spring 68 will cause the shaft 51 and arm 105 to hold the rack 100 above the pawl 99 and in engagement with the pawl 98 as shown in dotted lines in Fig. 8. And when the typewriter and attachment are connected the rack will be moved into the position indicated in dotted lines in said figure whenever a figure key lever is depressed.

As before described the driver 76 is moved leftward on the shaft 56 when either key 78 is depressed until the toe 80 of the lever of said key is intercepted by the arm 81. The parts are so proportioned and the escapement, consisting of the rack 100 and pawls 98, 99, is such that this leftward movement of the slide 82 will carry the driver 76 one step to the left of the carrying wheel 77 with which it should first engage. As the key 67ª is depressed, however, the rack 100 moves downward, or falls into the position represented in full lines in Fig. 8 and by engagement with the pawl 99 moves the slide 82 one step to the right and brings the driver 76 into proper position. This operation all occurs before either of the figure keys of the typewriter is operated to print the number to be recorded and added.

I provide mechanism for locating the typewriter carriage 150 at any desired point for tabulating figures or words, said mechanism also operating to properly locate the driver 76 for the beginning of each number. As shown, this mechanism is as follows: The shaft 91 is provided at its upper end with a pinion 106 which meshes with a rack 107 which in turn meshes with a pinion 108 upon a shaft 109 mounted in bearings on the upper part of the typewriter frame adjacent the carriage. Upon the shaft 109 are ten radial pins 110 which with one irregularity hereinafter noted are uniformly stepped about the shaft and spaced longitudinally thereon at distances equal to the units of the typewriter scale. Above the shaft 109 and carried in bearings on the typewriter carriage 150 is a shaft 111 having a series of pins 112 which are radially arranged and uniformly spaced about its circumference, said pins being separated longitudinally by distances which equal ten units of the typewriter scale. A bevel gear 113 on the shaft 111 meshes with a segment 114 carried by a rock shaft 115 and said rock shaft is also provided with an arm or blade 116 adapted to be engaged by the stems of either of a series of keys 117. The blade 116 is tapered and the shaft 115 inclined to the row of keys 117 so that the keys operate on the blade at different distances from the shaft. Each of said keys corresponds to ten units on the typewriter scale and is adapted to render its corresponding stop pin 112 operative. As before noted, the shaft 109 is provided with ten stops corresponding with the ten units of each division of the typewriter scale, and in the embodiment of the invention illustrated, the computing device or register is adapted to register only seven denominations. The slot 93 in the arm 92 is provided to render the first portion of the downward motion of the key board D non-effective so far as setting of the driver 76 is concerned and this link action is represented by the keys 78 bearing the numbers 8 and 9. This arrangement brings the zero pin 110 on the shaft 109 radially between the pins representing the seventh and eighth units.

From the foregoing it will be understood that when the keys 78 bearing the numerals 8 or 9 are depressed, the arm 92 will not be moved sufficiently to impart any movement to the lever 95. That is, the arm 92 is capable of moving the distance through which it is adjusted to operatively position the stop pins 110 corresponding to said keys without affecting the driver 76 of the computing mechanism. When the key 78 bearing the numeral 1 is depressed, the arm 92 will be moved through the same distance before actuating the lever 95 and then said arm and lever will move together sufficiently to impart to the driver 76 a movement corresponding to one of the divisions on the typewriter scale or one of the step by step movements of the typewriter carriage. Similarly when either of the other keys 78 is operated the arm 92 will be moved a distance greater by two divisions of the typewriter scale than is indicated by the numeral of the depressed key. It will be seen that the spring 101 acts to hold the driver in position to actuate the units disk or indicator of the register and that the effect of depressing the key-board D is to move the driver in opposition to said spring, the extent of such movement being determined by the particular key 78 which is actuated.

The typewriter carriage is located for the beginning of a number or a word at any part of the typewriter scale by depressing the key 117 corresponding to the section of ten units in which the number or word is to be begun, and depressing one of the keys 78 to locate the particular unit in the selected section of ten units. The key 78 through the connections before described rocks the shaft 109 and locates the proper pin 110 in position to engage the pin 112 which corresponds to the depressed key 117. While the two keys are depressed the carriage is moved until the selected pins 110 and 112 contact. The means by which the typewriter carriage is thus moved may vary according to the particular typewriter to which the invention is applied, but in every instance such means will include devices for disconnecting the feed rack from the key controlled escapement devices. Commonly, as in the machine illustrated, such disengagement may be effected by depressing a key connected with the feed rack and arranged in such relation to the keys 117 that the operator can simultaneously actuate with one hand said release key and the selected or desired key 117, while with the other hand the desired or required key 78 is actuated. The parts are thus adjusted to bring the first figure of the number or the first letter to be written in the desired position. If, for instance, it is desired to begin with the graduation 74 of the typewriter scale, the key 117 marked 7 and the key marked 4 of the key board D would be depressed and the carriage then moved until the pins 110, 112 corresponding to said depressed keys were in contact. In its operation the shaft 109 with its zero pin in line with pin 112 in the seventh section would rotate past pins representing the eighth, ninth, first, second and third units and stop at the fourth which is located four units to the left of the zero pin.

The register C includes a series of carrying wheels 77 and a series of numbered disks each bearing ten numerals. Each of said numbered disks except those at the ends of the series is provided with two gears 77$^e$ and 77$^f$, arranged respectively at the left and right of their associated disk. The numbered disk at the right hand side of the series is provided only with a gear 77$^e$ and the left end disk has only a gear 77$^f$ as is common in registers of this character.

Each carrying wheel 77 of the register C, as shown, is provided with twenty teeth and to one face of each carrying wheel is secured an additional wheel 140 having ten teeth. A spring 141 operating between the teeth of wheel 140 serves to bring the disks of the register into alinement for the purpose of bringing the figures on the several disks into a straight line and also to prevent the driver from being obstructed by a slight displacement of any of the carrying wheels. The carrying tooth 77$^a$ on each of said wheels 77 is movable in one direction and is spring pressed radially outward to its working position, as shown in Fig. 12. When in position just before or after carrying the disk of the next higher order, the said displaced disk may be operated by the driver without displacing the disk at its right, such operation merely pushing said carrying tooth out of the path of said gear. An index 134, projecting from slide 82 and visible through an opening 135 in the case of the register C, (Figs. 3 and 5), serves to show the location of the driver at any time.

Referring particularly to Figs. 3, 7 and 17, the train of gearing B includes an internally toothed gear 120 which is rigid with the frame of the motor and a similar gear 121 loosely supported on the winding shaft 122. A pinion 123 is rigidly mounted on the shaft 122 and a pinion 124 meshes with said pinion and with the gears 120 and 121. The pinion 124 has no support other than that furnished by the pinion 123 and the gears 120, 121. The gear 121 has less teeth than the gear 120 causing it to gain over the latter every time the idler 124 makes a complete revolution of gear 120, thus giving said gear 121 a very slow motion compared with the movement of the shaft 122. A pin 125 on the gear 121 passes during the complete winding of the motor spring from the rack 87 to the arm 126 of a vertical rock shaft 127 mounted on the frame. A ratchet 128 is rigidly connected with the winding shaft 122 and a gear 129 is loosely mounted on said shaft, a pawl 130 locking said gear and ratchet together in one direction. The gear 129 is as before pointed out adapted to be engaged by the rack 87 connected with the key board D. The key board D is in effect a lever every actuation of which will therefore act to turn the shaft 122, unless the rack 87 is disengaged from said shaft, as hereinafter described, and to transmit to the motor the power required to move all of the disks of the computing register that are to be operated by the depression of the figure keys of the typewriter for the number to be written. When the motor spring is fully wound, pin 125 will raise the rack 87 from engagement with the wheel 129 and when the motor spring is nearly run down said pin 125 engages the rearward end of the lever 126 rocking shaft 127. Said shaft 127 has an arm 131 to which is connected a rocking rod 132, said rod being adapted to pass under the end of the universal bar of the typewriter to lock the entire bank of keys when the spring is run down.

The operation of the invention which has been partially described in the foregoing description of the several parts may be briefly stated as follows: The register C will have its parts so adjusted that the ciphers on the several disks thereof will be in line with the openings in the register casing, and the escape wheel 57 will be in the position shown in Figs. 5 and 6, it being understood that the spring 68 is operating to hold the rear end of the lever 67 down and therefore the levers 50 are below the paths of movement of the levers of the figure keys of the typewriter. The typewriter may be used in the ordinary manner without effecting any change in the register or the position of the escape wheel 57. If it is desired to merely use the tabulator without affecting the register, the operator, by means of the keys 117 and 78, can readily position the stops 110 and 112 to begin the writing at the desired point on the typewriter scale and the operation of the typewriter will not change the position of the shaft 51 or move the escape shaft. When however it is desired to accumulate or add a series of numbers simultaneously with the recording or printing of such numbers by the typewriter, the operator will first position the typewriter carriage and the driver 76 as for tabulating by manipulating the keys 117 and 78 and moving the typewriter carriage to the desired position, and will then depress the key 67ª. As this key is depressed the shaft 51 will be rocked to bring the levers 50 thereon into engagement with the levers of the figure keys of the typewriter and the escape wheel 57 will be shifted to its right hand position where it is engaged by the stop 58, as shown in Fig. 2. While the key 67ª is held depressed, the operator will strike the figure keys corresponding to the number to be written and added, and as each of said figure keys is depressed the corresponding lever 50 will be moved, and through the turning of the shaft 51 the escape wheel 57 will be shifted into engagement with the arm 62 on the escape shaft 54, and the latter under the power of the motor spring will be turned until the stop 55 thereon comes against the stop 63 of the operative lever 50, and during such movement of the escape shaft the driver 76 will be correspondingly rotated and the amount or value represented by the depressed figure key of the typewriter will be accumulated in the register C. The driver 76 will be moved longitudinally of the shaft 56 with a step by step movement as each figure key is depressed through the action of the rack 100 and pawls 98, 99, on the slide 82. As each figure key rises the escape wheel 57 is returned to its right hand position into engagement with the stop 58, but is instantly shifted to the left into engagement with the arm 62 when the key representing a following figure is actuated. When the desired number has been written and added the operator, by releasing the key 67ª, permits the spring 68 to return the parts to the position in which the attachment is disconnected from the typewriter, in which position the escape wheel 57 is in engagement with the arm 62 on the escape shaft and said wheel and shaft 56 are held from turning by the engagement of the pin 75 with the rear end of the lever 67.

What I claim is:

1. A computing typewriter combining figure keys, a series of operating levers arranged to coöperate with the figure keys, a rock shaft adapted to be operated by each of said levers, an escape shaft adapted to be variably intercepted in its movement by said levers, a computing device controlled by said shaft, and means for rendering the computing device inoperative when it is desired to use the figure keys for printing only.

2. A computing typewriter combining a series of letter and figure types, key levers and keys therefor, a computing device comprising operating levers arranged to coöperate with said figure keys, and a rock shaft upon which said operating levers are mounted, said levers having a limited independent movement on said rock shaft.

3. A computing typewriter combining a series of letter and figure types, keys therefor, a series of computing disks, connections thereto from the figure keys including members which extend beneath and in alinement with the figure key levers, and an independent key for rendering said connections either operative or non-operative by said figure keys while the figure key levers remain in alinement with said members.

4. A computing typewriter combining figure keys, a computing device, operating levers for said device coöperating with the figure keys, means for normally holding said operating levers out of engagement with the figure keys, and a lever for throwing said operating levers into operative position.

5. A computing typewriter combining a movable key board, keys mounted on and movable relatively to said key board, a driver, connections between said keys and the driver whereby the latter is located in accordance with any one of said keys when depressed, and means for imparting a step by step movement to said driver.

6. A computing typewriter combining a motor for the computer, a movable key board therefor and connections between the key board and the motor whereby the latter is partially wound each time the key board is moved.

7. A computing typewriter combining a key board supported on pivoted arms, movable keys on said key board provided with stop projections, a driver, means connected with the key board for imparting movement to the driver in one direction, said driver being intercepted by the stop projection of the selected key, and means for imparting a step by step movement to said driver in the opposite direction.

8. A computing typewriter combining figure keys, an escapement device adapted to be released and variably stopped by the operation of said keys, a motor for driving said device, a computing mechanism, connections between said escape wheel and the computing mechanism whereby the computing mechanism is controlled, and means for automatically rewinding the motor as the computing mechanism is operated.

9. A computing typewriter combining a typewriter carriage, computing mechanism including a carriage, a setting device adapted to move said carriages to corresponding denominational positions comprising a stop mechanism including an element, one to control the computing device and another element to control the carriage of the typewriter.

10. A computing typewriter combining a typewriter carriage movable step by step, a computing mechanism including a member movable step by step independently of the typewriter carriage, and a means adapted to locate said carriage and member of the computing mechanism at corresponding operative positions.

11. A computing typewriter combining a typewriter carriage movable step by step, a computing mechanism having a member movable step by step independently of the typewriter carriage, a series of figure keys, and a locating mechanism, said keys and locating mechanism being operatively connected with both the typewriter carriage and the step by step movable member of the computing mechanism.

12. A computing typewriter combining a series of letter and figure types, keys with connections to said types, a carriage adapted to be actuated letter space distances by each of said keys, a computing mechanism including a member adapted to be actuated denominational distances by the figure keys, a lever adapted to locate both said carriage and said denominationally adjustable member of the computing device in accordance with its movement, and means to indicate the movements of said lever.

13. A computing typewriter combining a series of letter and figure types, keys with individual connections to said types, a carriage adapted to be actuated letter space distances under the control of each of said keys, a computing mechanism including a member adapted to be actuated a denominational distance under the control of each of the figure keys, a lever adapted to locate both the typewriter carriage and said denominationally adjustable member of the computing device in accordance with its movement, and keys to indicate the required positions of said lever.

14. A computing typewriter combining a series of letter and figure types, keys with individual connections to said types, and a carriage adapted to be actuated letter space distances under the control of each of said letter and figure keys, a computing mechanism including a member adapted to be actuated from denomination to denomination under the control of each of the figure keys, said carriage having several times as many spaces as said computing mechanism, a lever to determine the relative position of said carriage, and a second lever adapted to locate both said carriage and said denominationally adjustable member of the computing device in accordance with its movement, one of said levers being mounted on the typewriter carriage and the other on the frame.

15. A computing typewriter combining a series of letter and figure types, keys with connections to said types, and a carriage adapted to be actuated letter space distances under the control of each of said letter and figure keys, of a computing mechanism including a member adapted to be actuated from denomination to denomination under the control of each of the figure keys, a lever adapted to locate both said carriage and said denominationally adjustable member of the computing device in accordance with its movement, and a shaft actuated by said lever and provided with a spirally arranged series of stops to determine the respective positions of said carriage and adjustable member of the computing mechanism.

16. A computing typewriter combining a series of letter and figure types, keys with connections to said type, and a carriage adapted to be actuated letter space distances under the control of each of said letter and figure keys, a computing mechanism having a member adapted to be actuated denominationally under the control of each of said figure keys, said carriage having several sections adapted to coöperate with the computing mechanism, means to bring either of said sections of the carriage into operative relation to the computing device, and two series of keys, one to control the sectional position of the typewriter carriage and the other to control the required denominational position of both said carriage and the adjustable element of the computing mechanism.

17. A computing typewriter combining a series of letter and figure types, keys with individual connections to said types, and a carriage, a computing mechanism having a member adapted to be actuated denominationally under the control of the figure keys, said carriage having several sections adapted to coöperate with the computing mechanism, and means by which the required section of said carriage may be brought into operative relation with the computing device comprising two parallel shafts, each having a spirally arranged series of stops, to control the carriage for its sectional positions and its denominational positions, respectively, the said denominational shaft being operatively connected with the denominationally adjustable element of the computing mechanism.

18. A computing typewriter combining a series of letter and figure types, keys therefor, and a carriage adapted to be actuated letter space distances under the control of all the keys, a computing device, and independent connections from a member of said computing device to the figure keys for producing a step by step motion of said member comprising operative levers and a rock shaft, 51, upon which said operative levers are mounted.

19. A computing typewriter combining three distinct step by step mechanisms, one to actuate the typewriter carriage, one to actuate the adding mechanism for denominational movements, and one to operate the adding mechanism for figure value movements.

20. A computing typewriter combining three distinct escapements, one to actuate the typewriter carriage, one to actuate the adding mechanism for denominational movements, and one to operate the adding mechanism for figure value movements, and finger key devices to produce said operations.

21. A computing typewriter combining a step by step carriage feed mechanism, an adding mechanism including a member movable step by step for denominational adjustment, and requiring a variable source of power for figure value movements, a source of power, means to wind said source of power by a uniform movement, and means to automatically disconnect said uniform movement when said source of power is fully wound.

22. A computing typewriter combining adding mechanism, a step by step feed mechanism for the typewriter carriage, means to supply power to said carriage and the step by step movable member of the adding mechanism, a variable step by step device to designate the figure values, a source of power for the same, means to supply said source of power by a uniform movement, and means to lock the machine from further action when said power is exhausted.

23. A computing typewriter combining adding mechanism, each including a step by step movable member, of means to automatically supply power to said step by step mechanisms, a variable source of power for the adding mechanism, means to wind said source of power by a uniform movement, means to automatically disconnect the same when fully wound, and means to lock the machine from further action when said power is exhausted.

24. A computing typewriter combining a carriage adapted to be operated for letter space movements, and adding mechanism, key controlled means for imparting step by step denominational movements to a member of the adding mechanism, means controlled by the figure keys of the typewriting mechanism for imparting figure value movements to the adding mechanism, and means for applying three distinct sources of power, one to actuate the typewriter carriage, one to actuate the adding mechanism for denominational movements and one to operate the adding mechanism for figure value movements.

25. A computing typewriter combining a typewriter carriage, a computing mechanism, figure keys for controlling denominational movements of both said carriage and mechanism, while writing figures, tabulating keys for rendering any desired denomination of the computing mechanism operative and for positioning the carriage of the typewriter at the corresponding denominational points, key controlled figure value mechanism, and means controlled by the operation of said tabulating keys for actuating said figure value mechanism.

26. A computing typewriter combining a series of letter and figure types, keys with connections to said types, and a carriage adapted to be actuated letter space distances under the control of each of said keys, a computing mechanism having a member adapted to be actuated denominational distances under the control of each of the figure keys, an escapement connected with said denominationally adjustable member, a rack, connections from the figure keys to said rack, and means to actuate said escapement denominational distances along the rack.

27. A computing typewriter combining a series of letter and figure types, keys with connections to said types, and a platen carriage adapted to be actuated letter space distances under the control of each of said keys, a computing mechanism including a member adapted to be actuated from denomination to denomination and for figure values under the control of each of the figure keys, a motor for said computing mechanism, a setting lever for the denominationally adjustable member of the computing mechanism, and connections between said lever and motor whereby the latter is rewound by the movement of the former.

28. A computing typewriter combining a series of letter and figure types, keys with connections to said types, and a platen carriage adapted to be actuated letter space distances under the control of each of said keys, a computing mechanism including a member adapted to be actuated from denomination to denomination and for figure values under the control of each of the figure keys, a motor for said computing mechanism, a setting lever for the denominationally adjustable member of the computing mechanism, connections between said setting lever and motor for rewinding the latter, and means for throwing out the rewinding devices automatically when the motor is fully wound.

29. A computing typewriter combining a series of letter and figure types, keys with connections to said types, and a platen carriage adapted to be actuated letter space distances under the control of each of said keys, a computing mechanism including a driver, a setting device for the driver, said device being variably movable to set the driver in different positions, a motor for operating the driver, a rewinding device for the motor operated by said setting device, and means for imparting a constant movement to said rewinding device regardless of the extent of movement of the setting device.

30. A computing typewriter combining a series of letter and figure types and keys with connections to said types, a computing mechanism including a member adapted to be actuated from denomination to denomination under the control of each of the figure keys, means controlling the extent of said denominational movements of said adjustable member of the computing mechanism comprising a part adapted to be set backward, and means controlled by the figure keys for imparting a step by step movement to said part.

31. The combination of a movable paper carriage, the operating keys and printing devices, a plurality of adding wheels mounted in fixed position relative to the transverse movement of the paper carriage, an actuating device for the adding wheels normally out of coöperative relation with the operating keys, and means for bringing the actuating device and operating keys into coöperative relation with each other.

32. The combination with a computing device, of operating connections therefor, including a rock shaft having a series of arms and keys for depressing the same, and means for rocking the shaft to move the arms to inoperative position.

33. In a combined typewriting and computing machine, the combination with typewriting mechanism having keys including numeral keys, printing instrumentalities operated by said keys, and a carriage, of computing mechanism for automatically registering numbers written by said typewriting mechanism, a universal member operated by all of said numeral keys, and means for operatively connecting said computing mechanism with and disconnecting it from said numeral keys, said disconnecting mechanism comprising means for moving said universal member to an operated position and holding it there so that said member is not operated by operations of said numeral keys.

34. In a combined typewriting and computing machine, the combination with typewriting mechanism including letter keys and numeral keys, printing instrumentalities operated by said keys, and a carriage, of computing mechanism for automatically registering numbers written by said typewriting mechanism, said computing mechanism including a reciprocatory universal member operated by said numeral keys and not by said letter keys, a spring for holding said universal member in position to be operated, and means for moving said universal member to an operated position and holding it in such position in order to render said numeral keys inoperative to register numbers.

35. In a combined typewriting and computing machine, the combination with typewriting mechanism including letter keys and figure keys, printing instrumentalities operated by said keys, and a carriage, of computing mechanism for automatically registering numbers written by said typewriting mechanism, said computing mechanism including a series of levers operated by said numeral keys, differential mechanism controlled by said levers, a reciprocatory universal member operated by said levers, and means for moving said universal member to an operated position and holding it in such position in order to render said numeral keys inoperative to register numbers.

36. The combination with a traveling carriage, printing mechanism, and an adjustable computing device; of locating means including a stop for arresting the computing device, and stop mechanism for properly locating the carriage and said locating means with reference to the printing point.

37. The combination with a platen and a computing device adjustable relative thereto; of a locating-stop movable into and out of the path of said device.

38. In combination, a platen and printing mechanism, relatively movable, a computing device operated by the printing mechanism to add a column of numbers as the numbers are printed, a column-selective device adjustable to different positions to determine the location of the column to be computed, and a denominational selective device for arresting the relative movement of the platen and printing mechanism when the printing-point is opposite the desired denominational order of the column.

39. The combination with a platen, printing mechanism and a computing device having denominational members and arranged to be operated by the printing mechanism, the platen and printing mechanism being relatively movable and the computing device and platen being relatively adjustable, a column-selective stop for determining the relative adjustment of the computing device and platen to determine the location of the column to be computed, and denominational selective mechanism for arresting the relative movement of the platen and printing mechanism when the latter is in proper denominational relation with the column and the computing device.

40. In a combined typewriting and computing machine, the combination with numeral keys and computing wheels, of a source of power for operating said computing wheels to an extent determined by the numeral keys, and means preventing the operation of said keys when said source of power is inoperative.

41. In a combined typewriting and computing machine, the combination with numeral keys and computing wheels, of a source of power constantly tending to turn said computing wheels for operating said computing wheels to an extent determined by numeral keys, and means for preventing the operation of said keys when said source of power is inoperative.

42. In a combined typewriting and computing machine, the combination with numeral keys and computing wheels, of a source of power for turning said computing wheels to an extent determined by the operation of said numeral key, a universal bar extending adjacent the levers of said numeral keys, and a lock holding said keys against operation by means of said universal bar when said source of power is silenced.

43. In a computing machine, the combination with numeral keys and computing wheels, of a universal member for said numeral keys, a series of stops pivoted on said universal member, a master shaft adjacent said universal member, said master shaft comprising a series of stops fast on it, means operated by the depression of a numeral key for swinging its pivoted stop into the path of a fixed stop, means for causing said pivoted stop to swing said universal member as it reaches the limit of its throw, and an escapement for said master shaft for causing said master shaft to carry into the computing wheels the members represented by the keys struck.

44. The combination with a traveling carriage, printing mechanism and an adjustable computing device, of locating means including stop mechanism for locating the carriage, a stop for denominationally selecting a computing wheel in said computing device, and means for coupling said tabulating mechanism and said computing device stop.

45. In a combined typewriting and computing machine, the combination with a typewriter carriage having an escapement, of a computing carriage-having an escapement, numeral keys arranged to operate both said escapements, and a tabulating device for positioning said typewriter carriage in any denomination in any column and for simultaneously denominationally positioning said computing carriage.

46. In a combined typewriting and computing machine, the combination with a typewriter carriage and stops for arresting said carriage, of a computing machine carriage, means for simultaneously positioning said computing machine carriage, and separate stops for said computing machine carriage arranged to positively position said carriage accurately.

47. The combination with a computing mechanism, of a source of power for driving said computing mechanism, a series of numeral keys for controlling the drive of said computing mechanism by said source of power amounts corresponding to the numeral keys actuated, and numeral key-locking means automatically brought into play when said source of power is inoperative.

48. The combination with a computing mechanism, keys therefor, a source of power for actuating said computing mechanism, driving means automatically actuated upon the operation of said keys for energizing said source of power, and automatic means for silencing the drive of said source of power by said driving means when said source of power has reached the limit of its power-storing capacity.

49. The combination with a computing mechanism, of a series of numeral keys for controlling the action of said computing mechanism, a series of connections enabling the control of said computing mechanism by said numeral keys, and silencing means for moving said connections beyond the sphere of action of said numeral keys.

50. The combination with a computing mechanism, of a series of numeral keys for controlling the action of said computing mechanism, connections enabling the control of said computing mechanism by said numeral keys, and means normally tending to shift said connections between said numeral keys and said computing mechanism to ineffective position.

51. The combination with a computing mechanism, of a series of numeral keys connected to control the action of said computing mechanism amounts corresponding to the numeral keys actuated, and means for disconnecting said computing mechanism from said numeral keys to enable the free action of said numeral keys.

52. The combination with a computing device including digit-carriers and operating-keys for effecting the differential movement of said carriers, of operating connections between the keys and the computing device, said connections including an actuator movable to engage successive digit-carriers, a rock-shaft operatively related thereto, and a series of arms extending from the rock-shaft and operatively related to the keys.

53. The combination with a computing device including denominational members, and operating-keys for effecting the differential movement of said members, of operating connections between the keys and the computing device, said connections including an actuator movable to engage the denominational members in succession, a rock-shaft operatively related thereto, a series of arms extending from the rock-shaft, and a projection associated with each of the keys to engage one of the arms and thereby rock the shaft when a key is depressed.

54. The combination with a computing device and operating-keys therefor, of operating connections between the keys and the computing device, said connections including an actuator, a rock-shaft geared thereto, a series of fixed arms extending from the rock-shaft, a corresponding series of loose arms arranged to engage the fixed arms, said loose arms being operatively related to the keys.

55. The combination with a computing device and operating-keys therefor, of operating connections between the keys and the computing device, said connections including an actuator, a rock-shaft geared thereto, a series of fixed arms extending from the rock-shaft, a corresponding series of loose arms mounted to engage the fixed arms, and projections associated with the keys and disposed to engage the loose arms.

56. The combination with a computing device, of operating mechanism therefor including a shaft, a series of arms carried by the shaft and having graduated arrangement, keys for operating the arms to effect the operation of the computing device through the medium of the shaft, mechanism controlling the coöperative relation between the keys and arms, and a key for operating said mechanism to destroy such coöperative relation.

57. The combination with a platen, and printing mechanism for printing several columns, each including a series of denominations on a work-sheet supported by the platen, of a bodily-movable master actuator, and locating means in the path of said actuator to arrest the same for use in connection with any one of several columns.

58. The combination with a computing device, bodily movable to position the same with reference to different columns, and including a series of digit-carriers corresponding to the denominations or orders of a column, and stop mechanism for arresting said computing device to properly locate the same opposite the respective columns.

59. The combination with a support, of a computing device adjustable thereon, locking means for retaining the computing device in its adjusted positions, and an actuator for said locking means located adjacent the computing device.

60. The combination with a computing device, of operating mechanism therefor including a shaft, a series of arms carried by the shaft and having graduated arrangement, printing mechanism including keys arranged to operate the arms to control the computing device through the medium of the shaft when the keys are operated to print digits, mechanism controlling the operating relation between the keys and arms, and a key for operating said mechanism to destroy such coöperative relation to permit the printing of the total without operating the computing device.

61. The combination with a typewriter mechanism including numeral keys and a movable carriage, of a tabulator to control the movement of the carriage, said tabulator including an adjustable device, adding mechanism adapted to automatically add numbers printed by said typewriting mechanism in various columns and a column-selector adapted to be adjustably mounted on a portion of said typewriting machine and adjustable coöperatively with said device.

62. In a combined typewriting and computing machine, the combination of a typewriter carriage, type-controlling numeral keys to control the letter-feeding movements of said carriage, computing mechanism also controlled by said keys, said carriage movable into and out of a computing zone, and tabulating means for the combined typewriting and computing machine, including means for determining selectively both the zone and also the denomination in the selected zone at which the joint printing and computation operation is to be performed.

63. The combination with a computing device including a series of denominational members and carrying means, of a master wheel, and separate means for effecting relative lateral movement of the computing device and its master wheel in opposite directions to permit repeated operations of the computing device, each operation involving successive number wheels.

64. In combination, a traveling carriage movable to a plurality of different column positions or fields, a computing device, operating mechanism for the computing device and means for causing a coöperative relation to be established between the totalizer and its operating means successively as the carriage reaches different column positions during a single traverse or forward movement of the carriage.

65. The combination with paper supporting means and printing mechanism, relatively movable to permit several columns of numbers to be printed on a work sheet, of a computing device common to the several columns, means whereby the computing device will be operatively connected with the printing mechanism, whenever the printing mechanism is disposed to print in any one of the several columns, and keys constituting actuating means for the printing mechanism and computing device.

66. The combination with a platen and printing mechanism, of means for effecting the relative step-by-step movement thereof to permit the printing of several columns on a work sheet, a computing device, and means for operating said device to effect a computation including the numbers in the several columns.

67. The combination with printing mechanism and a platen for the support of the work sheet, said platen and printing mechanism being relatively movable to permit the printing of several columns of numbers on the work sheet, a computing device, and means for operating said computing device, as numbers are printed in different columns to compute a result with such numbers included in the computation, said means also controlling the relative movement of the platen and printing mechanism.

68. The combination with a typewriter including a platen and printing mechanism, relatively movable to permit the printing of columns at different points on a work sheet backed by the platen, and keys, of a computing device, and means for operating the same to effect a computation embracing the numbers in several columns.

69. The combination with two primary elements, to-wit, paper supporting means and printing mechanism, one of said elements being relatively stationary and the other movable to permit several columns of numbers to be printed on the work sheet, of a computing device common to several columns, and speed column-selecting means to determine the location of the several columns to be served by the computing device.

70. The combination with a computing device including a series of denominational members, of operating means for the computing device, a carriage mounted to travel forward and back, mechanism operating to bring the computing device and its operating means into coöperative relation during a plurality of periods in the forward movement of the carriage and to establish, during each period, a coöperative relation between the operating means and successive denominational members of the computing device.

71. The combination with a computing device including a series of denominational members and carrying means, of a master wheel, means for effecting relative movement of the computing device and master wheel to change their denominational relation, and means for effecting relative movement of the computing device and its master wheel to reposition the same.

72. In combination, a totalizer and a master wheel, a traveling carriage movable across a plurality of columns or adding fields and means for causing a coöperative relation to be established between the totalizer and the master wheel successively as the carriage moves across successive columns or adding fields during the forward movement of the carriage.

73. The combination with printing mechanism for printing several columns of numbers, and a carriage movable to effect the presentation of the printing mechanism to any desired column, of a computing device, and means for operating said computing device to compute the result of the combined operations of the printing mechanism, simultaneously with the printing of numbers in different columns, said means controlling the movement of the carriage.

74. The combination with key-operated printing mechanism arranged to print several parallel columns of numbers, of a totalizer, key-operated actuating means arranged to actuate the totalizer as the numbers are printed in the different columns, and means for re-positioning the actuating mechanism with respect to the totalizer prior to each operation of the latter embracing a complete number.

75. The combination with a typewriting machine, including a frame, printing mechanism, and a carriage movable on the frame to permit several columns of numbers to be printed on a work sheet, of a computing device adapted to effect a computation embracing numbers printed in several columns, means located at intervals and serving successively to position the carriage for computation, and means coöperating therewith and establishing an operative relation between the computing device and the printing mechanism.

76. The combination with a typewriting machine including a frame, printing mechanism, and a carriage movable on the frame, of a computing device, means spaced at intervals on the frame to successively position the carriage for computation, and means coöperating therewith and establishing an operative relation between the computing device and the printing mechanism.

77. The combination with a platen and printing mechanism, relatively movable to permit several columns of numbers to be printed on a work-sheet, of a computing device, operating connections therefor, the denominational relation of the computing device and its operating connections being controlled by the relative movement of the platen and printing mechanism and tabulating means for changing the column relation of the platen, printing mechanism, computing device and operating connections whereby the computing device may be operated to compute a total of numbers printed in different columns.

78. The combination with a platen and printing mechanism, of a typewriter carriage providing relative movement of said platen and said printing mechanism to permit several columns of numbers to be printed on a sheet, a computing device and an actuator therefor, a computer carriage providing relative movement of said computing device and actuator to change the denominational relation thereof during the printing of a number in a column and means for causing relative movement of the two carriages to change the columnar relation of said carriages whereby, when a number has been printed in one column and accumulated by the computing device, said carriages will be relatively positioned to permit the computing device to accumulate another number printed in a different column.

79. In combination with a traveling carriage, a computing device, keys controlling the operation of the computing device, and means for causing the computing device to be brought successively under the control of the keys as the carriage moves to successive column positions.

80. The combination of a main carriage, a computing carriage, the stroke or traverse of said main carriage being several times as great as that of said computing carriage, means for causing said carriages to effect step-by-step movements in unison, and mechanism for returning said computing carriage at different stages in the progress of the main carriage in a single direction.

81. The combination of a main carriage, a computing carriage, the stroke or traverse of said main carriage being several times as great as that of said computing carriage, means for causing said carriages to effect step-by-step movements in unison, means for returning said computing carriage at different stages in the progress of the main carriage, in a single direction, and means for determining the relationship or relative setting of said carriages at each return of said computing carriage during a single run of the main carriage.

82. The combination with a typewriting mechanism including type-operating numeral keys and a main carriage under the control of said keys and movable to different column positions or computing zones, of a computing device including a carriage, and means to enable the computing carriage to travel with the main carriage under the control of said keys in each computing zone during a single traverse of the typewriter carriage, and mechanism for resetting the computing carriage relatively to the main carriage, preparatory to computing in the next zone.

83. The combination of a typewriter mechanism, including a carriage movable to different column positions or zones, mechanism connected to the typewriter mechanism for computing the numbers written in the various zones, and tabulating mechanism for controlling the setting of the typewriter carriage and the computing mechanism for the various zones.

84. The combination of a typewriter carriage movable to different column positions or computing zones, a computing carriage resettable relatively to the typewriter carriage and capable of operation in each of said zones, and a tabulating mechanism for positioning the main carriage and computing carriage in each of said zones.

85. The combination with a typewriter carriage and a computing carriage, of a tabulating mechanism for said carriages, said tabulating mechanism including two sets of stops, to arrest the typewriter carriage at a point determined by said sets of stops, and also including a third set of denominational stops for said computing carriage.

86. The combination with a main carriage, of two coöperating series of stops for arresting said carriage, separate keyboards for controlling said series of stops, a computing carriage, and stops for said computing carriage controllable by one of said keyboards.

87. The combination of keys, a computing carriage having feeding movements under the control of said keys, a tabulating mechanism, and means controlled by said tabulating mechanism for variably limiting the return stroke of said carriage.

88. The combination of keys, a computing carriage having feeding movements under the control of said keys, a series of tabulating keys, means controlled by said tabulating keys for variably limiting the return stroke of said carriage, a device for returning said carriage, and means for enabling any of said tabulating keys to operate said carriage-returning device.

89. The combination with a computing mechanism including a series of denominational members and operating means, and also including a step-by-step moving member for effecting relative travel between said operating means and said series, of a typewriter carriage mounted to travel forward and back, and mechanism, including a denomination-selecting tabulating device, capable of positioning said typewriter carriage and of bringing the computing device and its operating means into coöperative relation for a plurality of periods or zones in the forward movement of said carriage, and of selectively establishing, during each period, a coöperative relation between the operating means and successive denominational members of the computing device.

90. The combination of a computing carriage having a relatively short stroke, and means for effecting said successive returns of the computing carriage, a main typewriter carriage having a relatively long stroke and movable to different zones for repeated coöperation with the computing carriage upon the successive returns of the latter to begin successive computations.

91. The combination with a typewriter carriage movable to a plurality of column positions or zones, of tabulating means for determining the column position or zone and the denominational position of said carriage, a computing mechanism having a traveling element operable when the carriage is in any of said zones, and connections whereby the traveling element is shifted by tabulating means which determine the position of the carriage.

92. The combination of a paper-carriage movable to a plurality of adding zones, a plurality of adding wheels mounted in fixed position relatively to the transverse movement of the paper-carriage, a single actuating device common to said adding wheels, and mechanism for coördinating the actuating device and paper-carriage for a limited travel through each of said adding zones and causing the movements of the paper-carriage to be accompanied by corresponding movements of the actuating device from one adding wheel to another in each of said zones; the paper-carriage being also movable from one zone to another independently of the actuating device.

93. The combination of the transversely movable paper-carriage, a plurality of adding wheels mounted in front of the paper-carriage upon an axis parallel with the movement thereof, an actuating device for the adding wheels normally unaffected throughout the movement of the paper-carriage, and means for coördinating the paper-carriage and the actuating device so that the further movement of the paper-carriage toward the left will be accompanied by a movement of the actuating device toward the right, said means controlling the movement of the paper-carriage toward the left.

94. In a combined typewriting and adding machine, the combination of a carriage and printing instrumentalities of a typewriter, mechanism for adding numbers written on the typewriter, said adding mechanism comprising a carriage that moves in unison with the step by step motion of said typewriter carriage, and means to control the movement of said adding carriage, said adding carriage releasable from said controlling means, to permit return of the adding carriage, and again restorable to the control of said controlling means, preparatory to further co-action with said typewriter carriage, whereby a plurality of numbers written on said typewriter in one line of writing can be added together on said adding mechanism.

95. The combination with a platen and printing mechanism, of a computing device, a locating means therefor, and tabulating mechanism for locating said means independently of the computing device.

96. The combination with a platen and printing mechanism, of a shiftable computing device, locating means for said device, and key-controlled means for moving said locating means independently of the computing device.

97. A combined typewriting and computing machine having numeral keys, computing wheels, and a master wheel therefor, said master wheel connected to be rotated at the operation of the numeral keys and also comprising, in combination, a spring for rotating said master wheel, and tabulator-key-operated devices for restoring the tension of said spring.

98. A combined typewriting and computing machine having numeral keys, computing wheels, a master wheel therefor, said master wheel connected to be rotated at the operation of the numeral keys, a carriage, and means for permitting computation to be done in different zones or column positions, and also comprising, in combination, a spring for rotating said master wheel and means for restoring the tension of said spring, said restoring means effective for all zones in which computation may be effected.

99. A combined typewriting and computing machine having numeral keys, computing wheels, a master wheel therefor, said master wheel connected to be rotated at the operation of the numeral keys, a carriage, and means for permitting computation to be done in different zones or column positions, and also comprising, in combination, a spring for rotating said master wheel, and means arranged to operate automatically independently of said carriage for restoring the tension of said spring.

100. A combined typewriting and computing machine having numeral keys, computing wheels, and a master wheel therefor, said master wheel connected to be rotated at the operation of the numeral keys, and also comprising a spring for rotating said master wheel, means for restoring the tension of said spring, and means for automatically disconnecting the said tension-restoring means when the tension has been fully restored to said spring.

101. In an adding machine, the combination with computing wheels, a master wheel therefor, and a spring device for rotating the master wheel, of intermittently operative means for re-tensioning said spring device, and means dependent upon the operation of said spring device for discontinuing the action of the re-tensioning means upon the spring device, whereby over-tensioning is avoided.

In testimony whereof I affix my signature in presence of two witnesses.

BENJ. M. DES JARDINS.

Witnesses:
 EVA S. SHELTON,
 WILLIAM H. BARKER.